(12) United States Patent
Kwan

(10) Patent No.: US 7,493,279 B1
(45) Date of Patent: Feb. 17, 2009

(54) COMPUTER SYSTEM AND METHOD FOR ON-LINE DISPLAY, NEGOTIATION AND MANAGEMENT OF LOAN SYNDICATION OVER COMPUTER NETWORK

(76) Inventor: Khai Hee Kwan, 1 Roma Ave, Kensington, NSW (AU) 2033

( * ) Notice: Subject to any disclaimer, the term of this patent is extended or adjusted under 35 U.S.C. 154(b) by 1885 days.

(21) Appl. No.: 09/628,098

(22) Filed: Jul. 27, 2000

(51) Int. Cl.
*G06Q 40/00* (2006.01)
(52) U.S. Cl. ...................................................... 705/37
(58) Field of Classification Search .............. 705/36–40
See application file for complete search history.

(56) References Cited

U.S. PATENT DOCUMENTS

| | | | | | |
|---|---|---|---|---|---|
| 3,581,072 | A | * | 5/1971 | Nymeyer | 705/37 |
| 4,789,928 | A | * | 12/1988 | Fujisaki | 705/37 |
| 5,640,569 | A | * | 6/1997 | Miller et al. | 710/241 |
| 5,826,244 | A | * | 10/1998 | Huberman | 705/37 |
| 5,884,270 | A | * | 3/1999 | Walker et al. | 705/1 |
| 5,940,812 | A | * | 8/1999 | Tengel et al. | 705/38 |
| 6,041,308 | A | * | 3/2000 | Walker et al. | 705/14 |
| 6,385,594 | B1 | * | 5/2002 | Lebda et al. | 705/38 |
| 6,415,320 | B1 | * | 7/2002 | Hess et al. | 709/219 |
| 6,466,919 | B1 | * | 10/2002 | Walker et al. | 705/37 |
| 6,564,190 | B1 | * | 5/2003 | Dubner | 705/36 R |
| 6,601,044 | B1 | * | 7/2003 | Wallman | 705/36 |
| 6,629,082 | B1 | * | 9/2003 | Hambrecht et al. | 705/37 |
| 6,671,674 | B1 | * | 12/2003 | Anderson et al. | 705/26 |
| 6,691,094 | B1 | * | 2/2004 | Herschkorn | 705/37 |
| 6,898,636 | B1 | * | 5/2005 | Adams et al. | 709/229 |
| 6,920,434 | B1 | * | 7/2005 | Cossette | 705/38 |
| 7,069,234 | B1 | * | 6/2006 | Cornelius et al. | 705/26 |
| 2001/0054022 | A1 | * | 12/2001 | Louie et al. | 705/38 |
| 2002/0116327 | A1 | * | 8/2002 | Sirinivasan | 705/38 |
| 2004/0024679 | A1 | * | 2/2004 | Wallman | 705/36 |

OTHER PUBLICATIONS

Connolly J., "S&P Starts New Service for Rating Private Placements", Dec. 21, 1992.*
Goldblatt, J., "Fitch creating a database to Rate Buyout Firms on How well Targets Fare Series: 11" American Banker, N.Y. Oct. 15, 1997.*

* cited by examiner

*Primary Examiner*—Hani Kazimi
*Assistant Examiner*—Olabode Akintola

(57) ABSTRACT

Bank syndicates post their syndication information to allow other banks the opportunity to evaluate competitive pricing in one website. Lenders post their requirements to allow syndicates to evaluate their requirements in one website. A bank or customer navigates to the site to obtain information and may confirm a posted bid in which case the site operator notifies the lender or syndicator. The lender or syndicator may then accept this confirmation and the site operator notifies the lender or syndicate who are successful in their posted bid. Alternatively, the entities involved may negotiate their bids for a particular syndication using an on-line interactive auction block. The web operator will then administer and manage on-line the syndicated loan on behalf of the syndicator.

16 Claims, 11 Drawing Sheets

UPDATE & ADD NEW & REVIEW CURRENT SYNDICATIONS

DIRECT MATCH
SYNDICATIONS

Date: 1-1-00

| Syndicate | Facility | Term | Risk | Amt | Country | Industry | Parcel | Rate | Collateral |
|---|---|---|---|---|---|---|---|---|---|
| OCBC | Bond | 5 | AA | 50 | USA | Garment | 10 | Libor + 120 | Guarantee |
| Anon | Tloan | 3 | BB | 100 | USA | Building | 5 | Libor +200 | Assets |
| Anon | Tloan | 3 | C+ | 20 | Thai | Building | 5 | 10 % | Assets |
| ABC | FRN | 5 | A | 200 | SG | Poultry | 10 | Sibor +200 | None |

100   110   120   130   140   150   160   170   180   190

To create and post your syndication please input details below. I agree that I have read the agreement here and my posting will be subject to review by Hosting Authority.

| Syndicate | Facility | Term | Risk | Amt | Country | Industry | Parcel | Rate | Collateral |
|---|---|---|---|---|---|---|---|---|---|
| Select | Input | Input | Input | Input | Input | Input | Input | Input | Input |
| Anon Name | Submit | | Upload Docs | | | | | | |

191

To update and repost your syndication please input details below. I agree that I have read the agreement here and my posting will be subject to review by Hosting Authority.

NOTE: SORRY YOU DO NOT HAVE ANY SYNDICATIONS — 193                192

| Syndicate | Facility | Term | Risk | Amt | Country | Industry | Parcel | Rate | Collateral |
|---|---|---|---|---|---|---|---|---|---|
| Nil | Nil | Nil | Nil | Nil | Nil | Nil | Nil | Nil | Nil |
| Anon Name | Submit | | Abort | | | | | | |

FIG. 2

| UPDATE & ADD NEW & REVIEW CURRENT AUCTIONS | | | | | | | | | |
|---|---|---|---|---|---|---|---|---|---|

AUCTION SYNDICATIONS

Date: 1-1-00

| Syndicate | Facility | Term | Risk | Amt | Country | Industry | Parcels Avail | Current Best Rate | Collateral |
|---|---|---|---|---|---|---|---|---|---|
| OCBC | Bond | 5 | AA | 50 | USA | Garment | 10 | Libor + 110 | Guarantee |
| Anon | Tloan | 3 | BB | 100 | USA | Building | 5 | Libor +200 | Assets |
| Anon | Tloan | 3 | C+ | 20 | Thai | Building | 5 | 10 % | Assets |
| ABC | FRN | 5 | A | 200 | SG | Poultry | 10 | Sibor +200 | None |

300    310    320    330    340    350    360    370    380    390

To create and post your syndication auction please input details below. I agree that I have read the agreement here and my posting will be subject to review by Hosting Authority.

| Syndicate | Facility | Term | Risk | Amt | Country | Industry | Close | Rate | Collateral |
|---|---|---|---|---|---|---|---|---|---|
| Select | Input | Input | Input | Input | Input | Input | Input | Input | Input |
| Anon Name | | | | | | | | | |

[ Submit ]   [ Upload docs ]

391

To update and repost your syndication auction please input details below. I agree that I have read the agreement here and my posting will be subject to review by Hosting Authority. Please Note there are restrictions on updates in an auction process. Read here ADMENTMENTS TERMS OF AUCTIONS

NOTE: SORRY YOU DO NOT HAVE ANY SYNDICATED AUCTIONS

| Syndicate | Facility | Term | Risk | Amt | Country | Industry | Close | Rate | Collateral |
|---|---|---|---|---|---|---|---|---|---|
| Nil | Nil | Nil | Nil | Nil | Nil | Nil | Nil | Nil | Nil |
| Anon Name | | | | | | | | | |

[ Update ]   [ Abort ]

TO PLACE A BID ON THIS AUCTION

AUCTION LIVE 5 Days 13 Mins Left
DETAIL SYNDICATION

Date: 1-2-00                                   400 — To see Documents Press Here

| Syndicate | Facility | Term | Risk | Amt | Country | Industry | Close | Rate | Collateral |
|---|---|---|---|---|---|---|---|---|---|
| OCBC | Bond | 5 | AA | 50 | USA | Garment | 1-07-00 | No Reserve | Guarantee |

| Bidder(s) | Time | Parcel Committed | Rate |
|---|---|---|---|
| BANK XYZ | 1-1-00 12.15 AM | 20 | Libor +110 |
| ANON | 1-1-00 12.11 AM | 20 | Libor +120 |

410                                 420

| Bidder | Commitment | Parcel | Rate |
|---|---|---|---|
| Select One | Guaranteed | Input | Input |
| ANON | Conditional | Input | Input |
| YOUR NAME | Autobid | Input | Input |

Rate must be better than or equal to the current bidder for Guarantee Commitment.

OCBC 5 Successful Syndication 2 Failed Attempts 1 Aborted. Total Value USD 305 million. Recorded 80 satisfactory feedback and 20 complains.

See other Syndication by OCBC — 430

Your Comment box

Agreement

Submit your comment anonymously

View others comments | BACK

Submit Now

By submitting, you submit yourself to the above irrevocable agreement.

UPDATE & ADD NEW & REVIEW CURRENT LENDERS

DIRECT MATCH LENDERS

Date: 1-1-00

| Lender | Facility | Term | Risk | Avail | Country | Industry | Min Rate | Collateral |
|---|---|---|---|---|---|---|---|---|
| OCBC | Bond | 5 | AA | 5 | USA | Open | Libor + 120 | Guarantee |
| Anon | Tloan | 3 | BB | 5 | USA | Open | Libor +200 | Assets |
| Anon | Tloan | 3 | C+ | 20 | Thai | Building | 10 % | Assets |
| ABC | FRN | 5 | A | 2 | SG | Electronic | Sibor +200 | None |

500　　510　　520　　530　540　　550　　560　　570　　　　580

To create and post your bids please input details below. I agree that I have read the agreement here and my posting will be subject to review by Hosting Authority.

| Lender | Facility | Term | Risk | Avail | Country | Industry | Min Rate | Collateral |
|---|---|---|---|---|---|---|---|---|
| Select | Input | Input | Input | Input | Input | Input | Input | Input |
| Anon Name | | | | | | | | |

Submit

590

To update and repost your lending interest please input details below. I agree that I have read the agreement here and my posting will be subject to review by Hosting Authority.

NOTE: SORRY YOU DO NOT HAVE ANY LENDING INTEREST　591　　　592

| Lender | Facility | Term | Risk | Avail | Country | Industry | Min Rate | Collateral |
|---|---|---|---|---|---|---|---|---|
| Nil | Nil | Nil | Nil | Nil | Nil | Nil | Nil | Nil |
| Anon Name | | | | | | | | |

Submit　　Abort

FIG. 6

TO PLACE A BID PAGE
DIRECT MATCH
DETAIL LENDERS

Date: 1-1-00

660 — Upload Docs/Agreements

| Lender | Facility | Term | Risk | Parcel | Country | Industry | Min Rate | Collateral |
|--------|----------|------|------|--------|---------|----------|----------|------------|
| OCBC | Bond | 5 | AA | 5 | USA | Open | Libor + 120 | Guarantee |

670

OCBC 5 Successful lending
Total Value USD 15 million. Recorded
80 satisfactory feedback and 20 complains.

See other lending offers by OCBC — 600

Comment box

Agreement

Submit your comment anonymously

Submit Now

BACK

By submitting you submit
..............................

UPDATE & ADD NEW & REVIEW CURRENT LENDING

AUCTION
LENDERS

Date: 1-1-00

| Lender | Facility | Term | Risk | Avail | Country | Industry | Current Best Rate | Collateral |
|---|---|---|---|---|---|---|---|---|
| OCBC | Bond | 5 | AA | 5 | USA | Garment | Libor + 110 | Guarantee |
| Anon | Tloan | 3 | BB | 10 | USA | Building | Libor +200 | Assets |
| Anon | Tloan | 3 | C+ | 2 | Thai | Building | 10 % | Assets |
| ABC | FRN | 5 | A | 2 | SG | Poultry | Sibor +200 | None |

700   710   720   730   740   750   760   770   780

To create and post your lending auction please input details below. I agree that I have read <u>the agreement here</u> and my posting will be subject to review by Hosting Authority.

| Lender | Facility | Term | Risk | Avail | Country | Industry | Close | Min Rate | Collateral |
|---|---|---|---|---|---|---|---|---|---|
| Select | Input | Input | Input | Input | Input | Input | Input | Input | Input |
| Anon Name | | | | | | | | | |

[ Submit ]

790

To update and repost your lending auction please input details below. I agree that I have read <u>the agreement here</u> and my posting will be subject to review by Hosting Authority. Please Note there are restrictions on updates in an auction process. Read here <u>ADMENTMENTS TERMS OF AUCTIONS</u>

NOTE: SORRY YOU DO NOT HAVE LENDING AUCTIONS

| Lender | Facility | Term | Risk | Avail | Country | Industry | Close | Min Rate | Collateral |
|---|---|---|---|---|---|---|---|---|---|
| Nil | Nil | Nil | Nil | Nil | Nil | Nil | Nil | Nil | Nil |
| Anon Name | | | | | | | | | |

[ Update ]   [ Abort ]

TO PLACE A BID ON THIS AUCTION

AUCTION LIVE 5 Days 13 Mins Left
DETAIL LENDERS

Date: 1-2-00                                    800 — Upload doc/agreements

| Lender | Facility | Term | Risk | Avail | Country | Industry | Close | Min Rate | Collateral |
|---|---|---|---|---|---|---|---|---|---|
| OCBC | Bond | 5 | AA | 5 | USA | Garment | 1-07-00 | Make Offer | Guarantee |

| Bidder(s) | Time | Parcel Committed | Rate |
|---|---|---|---|
| BANK XYZ | 1-1-00 12.11 AM | 2 | Libor +110 |
| ANON | 1-1-00 12.00 AM | 2 | Libor +105 |

810                                                   820

| Bidder | Commitment | Parcel | Rate |
|---|---|---|---|
| Select One | Guaranteed | Input | Input |
| ANON | Conditional | Input | Input |
| YOUR NAME | Autobid | Input | Input |

Rate must be better than or equal to the current bidder for Guarantee Commitment.

OCBC 5 Successful Lending. 2 Failed Attempts
1 Aborted. Total Value USD 25 million. Recorded
80 satisfactory feedback and 20 complains.

See other Lending by OCBC — 830

Your Comment box

Agreement

Submit your comment anonymously

View others comments    BACK

Submit Now

By submitting, you submit
..............

MY SYNDICATION PAGE

Status : Manager
Date: 5-1-00

OCBC BANK 3 YEARS BOND US 50 Million                                      900

| Client | Facility | Term | Risk | Amt | Country | Industry | Ave Rate | Collateral |
|--------|----------|------|------|-----|---------|----------|----------|------------|
| OCBC | Bond | 3 | AA | 50 | USA | Open | Libor + 125 | Guarantee |

List of Participants 910            920

| | | |
|---|---|---|
| BANK AXY | 10 | 04/12/00 Confirmed |
| NAB | 10 | 04/11/00 Confirmed |
| CHINA BANK | 10 | 04/10/00 Confirmed |
| CBA | 20 | 04/10/00 Confirmed |

| Drawdown | 06/1/00 |
|---|---|
| First Interest | 12/1/00 |
| Second | 06/1/01 |
| Third | 12/1/01 |
| Fourth | 06/1/02 |
| Fifth | 12/1/02 |
| Sixth | 06/01/03 |

ACCEPT

| Documents | Status | Action |
|---|---|---|
| Financial Reports | Yes | |
| Due Diligent Report | No | To Email |
| Agreements | Yes | |
| Trustee Agreements | No | To Email |
| Board Approvals | Yes | |
| Regulatory Approval | Yes | |
| Fee Document | Yes | |
| Condition Precedents | No | To Email |

| | |
|---|---|
| Messaging | Activated |
| Monitoring | Activated |
| Docs Storage | Activated |
| Billings | Activated |
| Settlement | Not Active |
| Accounts | Not Active |

930                  950

| Monitoring | Date | Action |
|---|---|---|
| Bank AXY seek clarification | 04/09 | CK |
| Legal Documents for signature | 04/01 | CNH |
| Board Approval received | 03/11 | CVT |
| Board Approval NAB | 03/11 | CVT |
| Board Approval CBA | 03/10 | CVT |
| CHINA BANK query | 03/09 | CK |
| Board Approval NAB | 03/04 | CK |
| Roles and Fees Settled | 03/03 | CK |
| CHINA BANK query | 03/02 | CK |
| Regulatory Approval | 03/02 | All |
| Acceptance by ALL | 03/02 | All |
| Auction Closed and selection | 03/01 | All |

Other Syndication

Nil

You Participated in

Nil

Sent Email

Update Changes

Log Out 940                                960

FIG. 10

COMPUTER SYSTEM AND METHOD FOR ON-LINE DISPLAY, NEGOTIATION AND MANAGEMENT OF LOAN SYNDICATION OVER COMPUTER NETWORK

CROSS-REFERENCE TO RELATED APPLICATIONS

Nil

STATEMENT REGARDING FEDERAL SPONSORED RESEARCH OR DEVELOPMENT

Not Applicable

REFERENCE TO A MICROFICHE APPENDIX

Not Applicable

BACKGROUND OF THE INVENTION

1. Technical Field

The present invention relates generally to the syndication and management of syndicated loan facility. More particularly, the invention relates to an online display auction method whereby users of online systems, namely, lenders, banks and loan originators, may negotiate loan rates, loan parcels, conditions and accompany terms with each other in an online, anonymous manner. In addition, the invention relates to an online method where loan syndicates and originators may post loan rate and information for loan syndication to allow lenders the opportunity to evaluate competitive prices, preferably in one consolidated location (e.g., a web site) in order to get the maximum return.

In also provide for potential lenders to post their requirements to participate in any loan syndication and to allow syndicates the opportunity to evaluate the different resources available in order to get the least borrowing cost for their client. The invention further relates to managing and monitoring of loan syndicates on-line once the loan syndication is completed.

2. Description of the Related Art

The World Wide Web is the Internet's communication medium and information retrieval system. In the web environment, client machines effect transactions to web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In practice, the web is a vast collection of interconnected documents link together by hyperlinks, spanning the world. The advantage of hypertext is that in a hypertext document, if you want more information about a particular subject mentioned, you can usually "just click on it" to read further detail. In fact, documents can be and often are linked to other documents by completely different authors. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. The browsers can, in addition, access files by FTP, NNTP (the Internet news protocol), gopher and an ever-increasing range of other methods. On top of these, if the server has search capabilities, the browsers will permit searches of documents and databases. One of the technical advantages of the World Wide Web is the ease with which information may be posted and retrieved by users who have on-line access. In the banking industry the way that loan syndication is arranged is that information are faxed to potential lenders usually other banks. The originator ie the managing bank will then collect this information and feedback to enable it to conclude an opinion regarding the prospect of the loan and report back to the client. This method is called "sounding" and the advantage is to be able to price a loan correctly. There are many banking sites now which deals directly with consumers but not one for bank to bank business. Loan syndication is a specialise business and therefore the information are not easily obtained directly. There are currently publications like FIR or Basispoints which deals with past and reported on loan syndication done. These publications are not for banks to contact other banks to strike a deal.

It would be highly desirable to provide an online business method wherein banks or financial institutions can obtain syndication commitments anonymously from one or more loan originators, and negotiate terms and pricing with them. From the originators' point of view it is an advantage to be able to reach out to the whole community directly through this website giving them a quicker turnaround time. Lenders will also be able to look at competing syndications to discover better terms at the same website. Given the nature of the auction process, the ultimate benefactor will be the final borrower which will see reduced borrowing costs by reaching to wider audience. In the same way, the automation of the administration process of loan syndication is included hence reducing the cost of overall service cost. The present invention solves all these issues.

BRIEF SUMMARY OF THE INVENTION

According to the present invention, loan syndicates post loan rate and associated information for various loan facilities to allow potential lenders the opportunity to evaluate competitive prices, preferably in one consolidated location (e.g., a web site). A potential lender navigates to the site to obtain this information offered by a loan syndicate. The customer may accept a posted rate, in which case the site server notifies the loan syndicator.

According to another feature of the invention, the web site offers an auction process at which anonymous (or identified) buyers and sellers may post and accept bids for loan rates, parcel, terms over given loan syndication proposals. Thus, for example, using the auction process, an anonymous lender (i.e., a customer) may make a bid that are then placed in an order of the best price (ie the next entry has to be better or equal than the last). Given a loan syndication looks at more parameters than mere pricing, for example the parcel (the amount of loan being provided), and the level of commitment which may be guaranteed or conditional, no action can be taken until the auction closes. Given the complexity of these various offering, a computer program is used to enable the seller to determine the best offerings in terms of a risk return matrix which satisfies at least both the minimum cost and total amount sought criteria. This program will first arranged the guaranteed commitments and where the total amount sought is not conclusive will include the conditional parcels up to the point where the total amount sought is satisfied. This resultant matrix is then emailed to the seller at which point the seller (a loan syndicator) may decide as to the "winning" bid or bids.

Alternatively, an anonymous or known seller (a loan syndicator) may make a bid, e.g., because the entity has additional unsold loan commitment over a given class of borrower risk or terms or rate at a given time, which bid may then be accepted by a buyer (e.g., an anonymous lender). Likewise a similar risk matrix program is used here to enable the buyer to consider the various propositions which may include more than one winning bids at the end. For example, where a lender has 100 million to lend out, a number of bids are provided which are parcel from 5 to 10 million each with various commitment levels, then such a program will be useful to sort out the winning bids which satisfied the best return and the target of 100 million. After any given bid is accepted or at the close of an auction, the site notifies each of the parties, e.g., by e-mail, of the outcome (e.g., acceptance) of a given negotiation for a posted bid. It should be noted that while a lender may ask for a bond facility (for example) it does not preclude the syndicator to offer a facility of a different nature or different period through feedback or under the "conditional" commitment.

While this invention is focused on new or primary issues, there is no reason why secondary issues cannot be negotiated between the parties on-line. A secondary issue refers to a party who is already in a syndicate but may wish to transfer or assign his obligation of the loan to another. The ability to assign part of a loan commitment is dependent to conditions and terms of the loan syndication.

An important feature here is that loan syndication auction is different from a normal auction where there is only one winner at closing time. Loan syndication here will select the lowest cost and aggregate other bids into the required total amount which means it should have more than one winner. The fact that it is being syndicated means that it should have more than one party to be in a syndicate.

Preferably, the site earns a fee for each seller bid that is accepted by a given buyer. Likewise, the site may earn a fee for each buyer bid that is accepted by a given seller. The site may earn fees for maintaining the administrative layer of the loan syndication by automating such tasks as messaging committed lenders and final borrowers of the various legal obligations under a committed loan syndication, transferring fund from lenders to final borrower, paying interest and principal to the lenders including any management fees, to keep records such as due diligent reports, updating credit reports, receiving financial statements from final borrowers and calculating various interest and principal repayments.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 2 is a representative user interface illustrated a page for Direct Match Syndication where Syndicates can update, add and abort for this invention. This page is also use by lenders to compare the syndicates on offer;

FIG. 4 is a representative user interface Auction Syndication for syndicated loan auction where syndicates provide details of their offerings and latest best bids. Syndicates can update, abort, add in this page for this invention;

FIG. 5 is a representative user interface to confirm participation in this chosen loan syndication auction;

FIG. 6 is a representative user interface illustrated a page for Direct Match Lenders. Lenders posted their requirements here to invite syndicates. Lenders can add, update and abort from this page in the invention;

FIG. 7 is a representative user interface illustrated a page for the syndicate to confirm their interest in the lender's bid;

FIG. 8 illustrates a user interface for Auction Lending by which Lender's interest is being bided by syndicates. Lenders may update, add and abort their auction here in this invention;

FIG. 9 illustrates a user screen by which a syndicate may confirm their bid to the lender's auction.

FIG. 10 illustrates a representative screen of the administrative page "My Syndication" where the loan syndicator may administer, manage and monitor the syndicated loan.

DETAILED DESCRIPTION OF THE PREFERRED EMBODIMENT

Figure 1A:
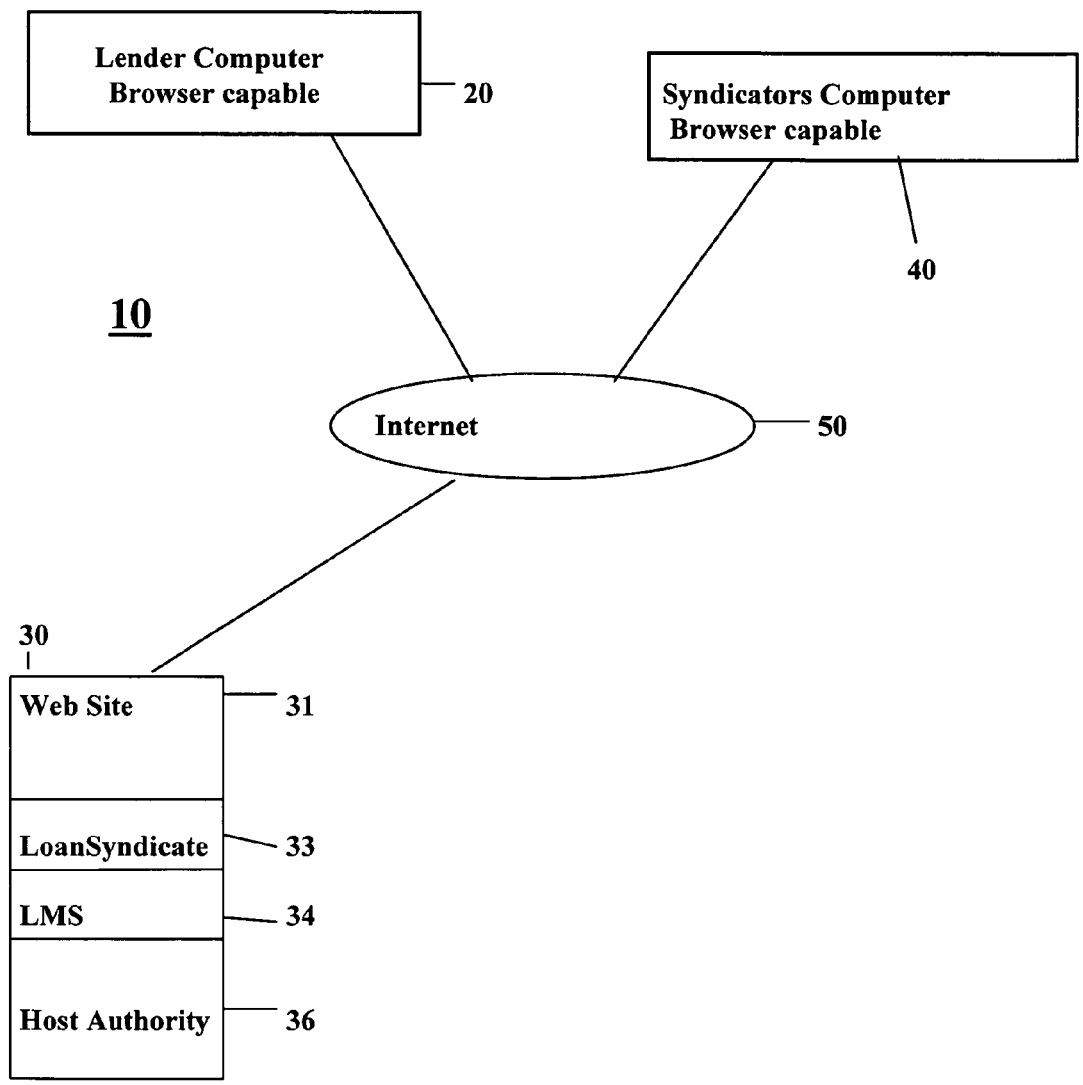
FIG. 1A is a simplified illustration of a computer network system in which the present invention may be implemented.

FIG. 1A is a block diagram of a computer network system 10 of the present invention. Computer system 10 comprises at least one client computer 20, preferably a computer workstation. Computer 20 is connected to a host server computer 30 and at least one of syndicator's computers 40, over at least one computer network 50.

Computer 20 is a computer generally known in the field of computers. A host server computer 30 contains hardware and software adapted to communicate with other computers over a computer network and to make available computer files or software stored in the server computer or a storage device connected thereto such that they can be accessed by a person from another computer connected to the network.

Although one host computer server is adequate for the purpose of this invention, to achieve the benefit of redundancy, data security and distributed computing, more than one computer servers is preferred.

The computer system of the present invention operates as follows:

Computer 30 makes available a web page which is a server side program written in either PHP3 or in Active Server Pages (ASP), which is accessible by users computer 20 and 40 through computer network 50. This is where the main entry point is into the system and authentication is required. After such confirmation, the users will be brought into a welcome page (FIG. 11B) where it is divided into two section where brief summary details of facilities are available.

In this invention, there will be two categories under Auction and Direct Match, the latter meaning publish loan facilities for syndication that are on offer. The user then decides on the links provided which will bring him into their respective pages such as Auction or Direct Match. These are further illustrated by FIGS. 2-10 below.

FIG. 1A depicts a preferred embodiment of a computer system 10 for conducting loan syndication of the present invention. Computer network system 10 comprises a general purpose computer 30 as a server connected to computer network 50. Preferably, server computer 30 is a computer workstation, and computer network 50 is the Internet. More preferably, server computer 30 is connected to the Internet 50 via the fastest available connections.

Server computer 30 includes: (1) a World Wide Web site 31 such as www.loansyndicates.com (2) a computer software 33, designated herein as "LoanSyndicate" for managing the "front-end" of the system such as receiving and accepting bids and generating the responses to the clients requests when they click through the website; (3) a computer software 34 called Loan Management System (LMS) for managing the "back-end" of the system such as the managing database with updates, deletion, administrative procedures, billings (4) Approving/Host Authority 36 a program that checks whether all criteria are meet before posting the application to the website. They are described in more detail below. All programs are accessible via their respective clients and are managed at the server side.

A. The Web Site

In the preferred embodiment, Web site 31 provides the following information or applications:

(1) A summary of current loan syndication and status;

(2) Description of the types of facilities available to both auction and direct match;

(3) Description of the organization, designated herein as www.loansyndicates.com, that runs the loan syndication auction and list of benefits and costs for using the auction system;

(4) Description of required legal disclosure for using the system;

(5) Pre-qualification registration, login and handle assignment forms;

B. LoanSyndicate 33

Residing on server computer 30, LoanSyndicate 33 is a client/server response/request application which is used to manage users activities. It is the front-end of the website and includes input requests which are processed and pass-on to the back-end Loan Management System 34 for action. By design, it populate processed data from the database to be displaced to the users upon request. It then request the users to take further actions on this information such as providing instructional links, inputting a bid, updates, add new and so on. By itself, this program cannot execute these requirements but only facilitates them using commands such as "post" and "submit" for further action to Loan Management System 34 since these data can only be processed at the backend.

C. Loan Management System 34

Loan Management system (LMS) is a client/server application residing on server computer 30. It operates to manage the client response/requests sent by LoanSyndicate 33. It is also responsible for electronically submitting a potential bid either new, abort or update to host authority for approval. It also operates to enter an approved bidder application into the database. LMS 34 is designed to be all purposed and can be adapted for as many administrative functions as possible. It is noteworthy to note that in loan syndication, it may not be possible to accept one single bid and as such most bids are aggregated to complete the full amount required in the order that has the lowest costs to the final borrower. Loan Management System 34 will sort this bids into a risk return matrix which takes into consideration the various parcels and commitment levels from the bidders and email this resultant matrix to the loan syndicator for action. After the loan syndicator has decided on the bidders based on the said matrix and confirms acceptance to LMS 34, emails will be sent to notify both successful and unsuccessful bidders. Where successful bidders/syndicates are anonymous, their identity will be reveal to all the other successful participants. Loan Management System 34 then withdraws the auction's record and updates the status as closed in the database.

Depending on requirements, it may then execute its administrative functions for this completed loan syndication such as to send reminder emails, monitors the lenders' obligation to the terms of the facility electronically, monitors the feedback form lenders, provides instructions to transfer funds between final borrower on behalf of the loan syndicator and lenders accordance to terms of contract after receiving approval from loan is syndicator. This administrative function requires inputs such as the relevant dates and associated information as illustrated in FIG. 10. In Direct Match, on acceptance of an offer, LoanSyndicate 33 notifies LMS 34 and LMS 34 sends messages to both parties and record the transaction ready for billing.

(D) Host Authority (36)

Host Authority functions as a "moderator" program where entries are considered and verified under varies coded rules pertaining to the type of facility and by the web site operator.

The computer programs as described above at the web site includes appropriate display routines for generating a set of display screens that together comprise a user interface for the site. By going through these displays, one will be able to see the real functions of each program and their interactivity. FIGS. 1B-10 are representative display screens, although the particular screen layouts should not be taken to limit the scope of the present invention.

Figure 1B:
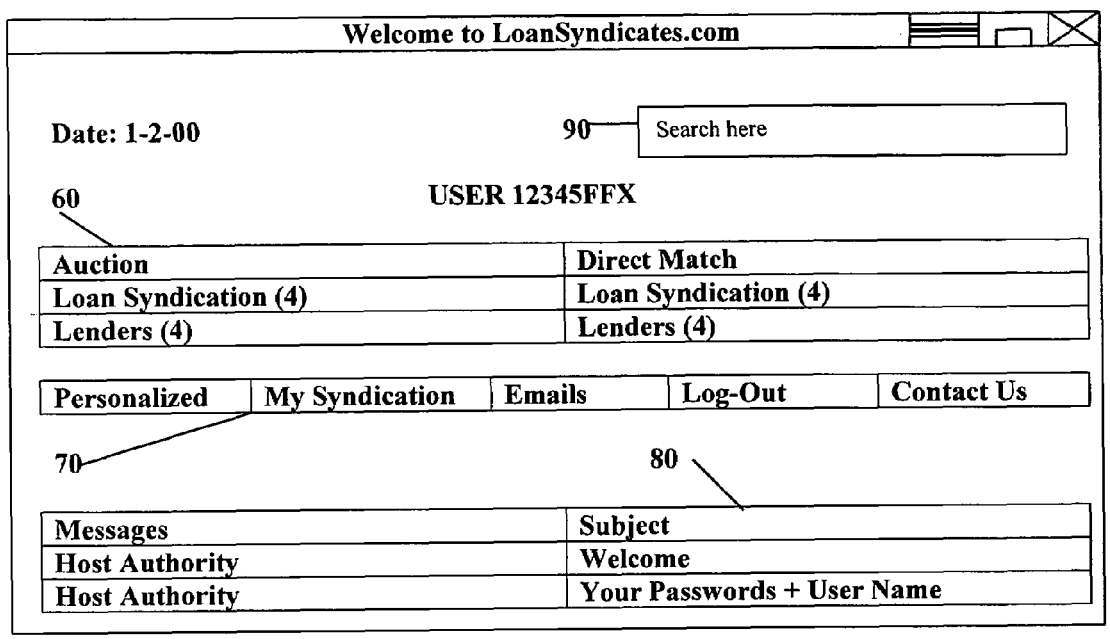
FIG. 1B is a simplified user interface illustrated a home page for the loan syndication web site of the present invention.

FIG. 1B shows the web page after the user has successfully logged on to the system server. At Box 60, it shows the current listing with the left hand column showing the Auction category and the right hand showing the Direct Match. Under Auction, we have 4 loan syndication available and 4 lenders. The same is reflected in Direct Match. By clicking on to the hyperlink, say "loan syndication" under Direct Match we will arrive at FIG. 2. In Box 70, we can see various buttons, the first from the left is "Personalized" where the user may personalise as to the type of loan syndication that appeals to the user or as the case maybe lending requirements. The second button from the left shows the "My Syndication" and on pressing this, it will bring the user to the admin page at FIG. 10 where this page shows any syndicates that the users have subscribed to, in this case there is none. In examples where there is, user will be able to click and see administrative details and status reports. This list is not exhaustive and dependent on the facility used. The next button refers to "Emails" where host authority corresponds administrative matters with the user. Although not a requirement, it is prefer that in this invention all correspondence will be stored here like a web-based email systems to eliminate potential conflicts arising from non-delivery of emails. Again the user may personalise this to be sent to his or her respective email box external to the system. However a copy is always stored in the system as long as it originates from this system either from another user or system administrator. Box 80 shows the user's emails menu after clicking on the email button. To enable better search, a search input box is seen at 90 which searches the entire database by keywords such as bond, rates, etc.

FIG. 2 is a simplified personalised user interface illustrating a Direct Match Syndication's home page for the web site of the present invention. A user, which may be a lender or a syndicator after being authenticated by the web server and having chosen Direct Match category, navigates to this page in the usual manner by activating the loan syndication hyperlink. The page preferably includes a set of hyperlinks at 100 under each syndicate's name where the user can click to see more details at FIG. 3. It is important to note here that users may use their real identity (OCBC) or Anonymously (Anon).

Figure 3:
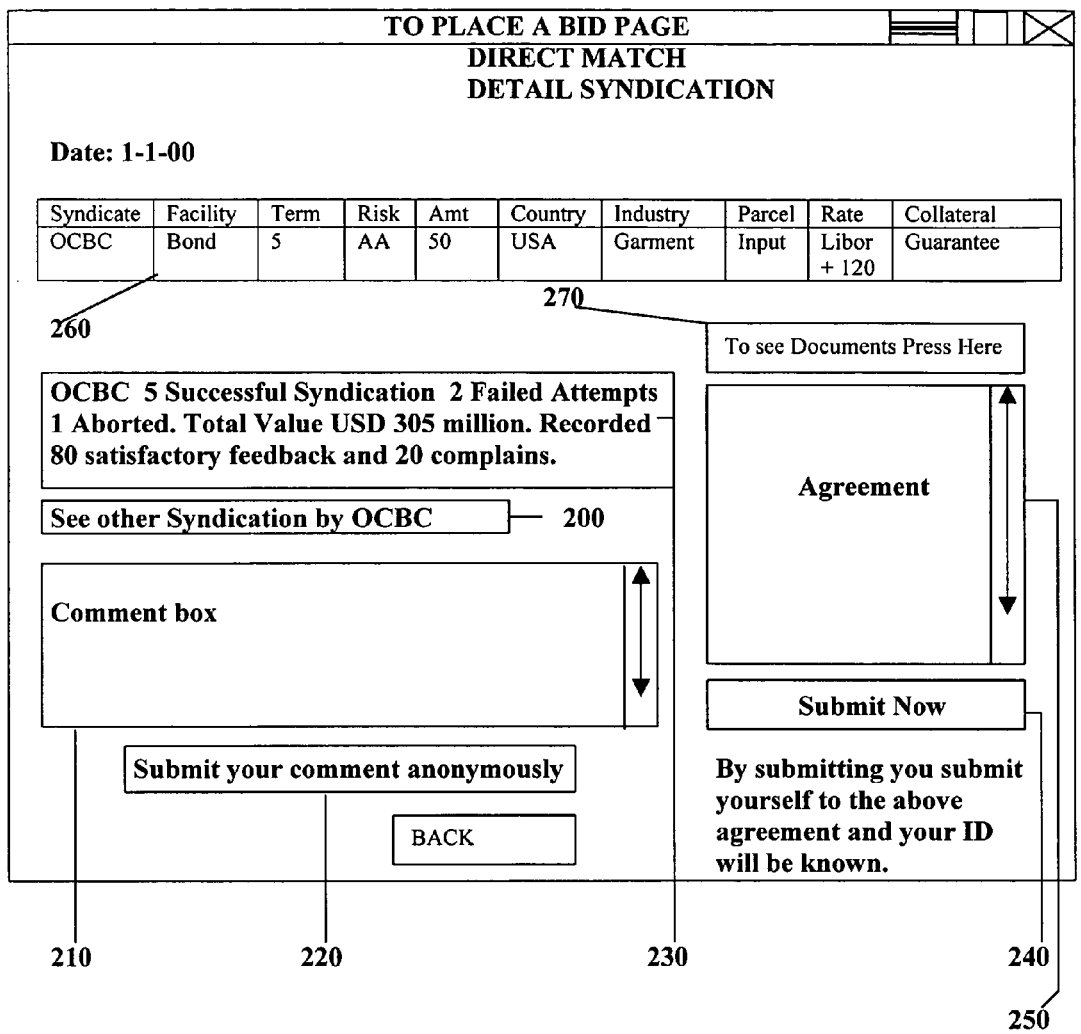
FIG. 3 is a representative user interface to confirm a loan syndication under Direct Match for this invention.

At 110, one can see the type of facility being offered by the Syndicate and upon clicking the link here, further description of the facility will be available. At 120, this column refers to the period of the facility. At 130, this column refers to the risk class of the final borrower where there they are rateable. AA in this instance will be well regarded as compared to C+. At 140, this column refers to the Amount being sought by the final borrower. Note that the final borrowers' identity is never revealed until upon acceptance in this system. Interested parties may seek further information and negotiate as shown in FIG. 3 in Box 210. At 150, this column shows the country where the final borrower is legally domiciled to ascertain the country risk. At 160, this column shows the industry that the final borrower is in seeking this loan. For example, a conglomerate may have many subsidiaries and if one of the subsidiaries is seeking the loan, the loan may be booked under the parent's name but it is that subsidiary's industry that is reflected here. At 170, this column reflects the amount of loan outstanding, so in the case of OCBC it requires 50 million to close this syndication and it is short of 10 million.

At 180, this shows the published rate LIBOR+120 and at 190 this column shows whether the syndicating loan has any collateral backing. In the case of OCBC (the syndicator), it indicates that a guarantee is behind the facility. In Box 191, the user has the ability to post their own syndicate which is then review by the Host Authority 36 before being posted to the web site. In Box 192, this box shows any syndication that is currently being offered by this user. In this case there is none which is denoted by Box 193. According to "Direct Match" in the present invention, lenders and syndicates post published information in accordance to their needs. This information allows customers the opportunity to evaluate competitive prices in one consolidated location on line.

Generalizing, according to the invention, a "buyer" is any entity or entities desiring to lend money or to join a syndicate (also known as a potential lender), while a "seller" is any entity or entities engaged in the originating the loan syndication on behalf of the final borrower (also known as the syndicator or originator). Moreover, a given seller (syndicator) or buyer (potential lender) may be, for example, a person, an organization, an entity, a computer, a machine, a resource, a device, a process, or a program. Thus, one of ordinary skill in the art will appreciate that the activities of buyers and sellers in accordance with this invention may be under programmatic control and, thus, partially or fully automated.

As will be described further below, a given buyer and a given seller may use the present invention and/or the tools described below to reach an understanding regarding a given loan syndication. Thus, as will be seen, a given buyer may negotiate with a given seller (or vice versa) online to secure a loan syndication commitment. As used herein in FIG. 5, a "commitment" may be guaranteed, conditional, unconditional, provisional, or the like, as the parties or the site provider may agree. Thus, the present invention is not limited to any particular contractual understanding that may be created between buyer and seller.

Activating the first hyperlink "OCBC" in column 100 in FIG. 2 navigates the user to a submission form as illustrated in FIG. 3.

This form is preferably implemented using ASP or PHP script in a known manner. At button 200, the user can press to see a list of other syndication currently being run by OCBC. At Comment Box 210, the user will be able to sent comments and negotiate with OCBC anonymously. At button 220, this is the button to press to submit comments anonymously. At Box 230, the user is provided with a history of OCBC's activities which are extracted and compiled by LMS 34. At button 240, the user is agreeable to the syndication and submits its confirmation. On pressing this button, it will ask for the digital certificate to the user which must be sent together for verification by Host Authority 36. Once this is verified both user and syndicator will receive confirmation by Host Authority but only when the syndicator accepts this confirmation is the deal done. The Host Authority will notify the user when the Syndicator accepts its confirmation. If the deal is done and if the obligation is fulfilled under the user's submission, the offer maybe withdrawn from the display. If the offer is partially fulfilled in terms of amount then the new amount sought will be updated in the display screen. At 250, the agreement pertaining to this bond facility is shown readable on-line or may be downloaded by right clicking on the mouse using save as. At 260, the only variable capable of being inputted/changed here is the number under "Parcel" where the user may input another amount but by default, it stands as the outstanding amount as submitted by the syndicator. At button 270, the user may press to view documents relating to this syndication such as audited financial statements of final borrower and other supportive documents (with the borrower's name taken out). This can either be in a reformatted text or in the original scanned with the names/identity blackened or removed.

In FIG. 4, this is a page linked from the hyperlink in FIG. 1B when the user presses on Loan Syndication under the Auction category. Similarly, it has the same features as in FIG. 2 where 300 refers to the syndicate's name. 310 refers to the type of facility. 320 refers to the term of the facility. 330 refers to the risk type of the final borrower. 340 refers to the total amount sought. 350 refers to the country of the legal domicile of the final borrower. 360 refers to the type of industry that the final borrower is in. 370 refers to the parcel of loan available. In this case, 40 million has already been committed so leaving 10 million outstanding. As this is a LIVE bidding process and until it is closed, one should note that a new bidder can come in and bid the full 50 million at a better price which will then deny those that already committed in this case BANK XYZ and ANON with 20 million each standing now as seen in FIG. 5. Unlike Direct Match where it operates on a first come first serve basis, in this auction, the final winners are only known at the close of auction and after acceptance by seller. A better price here is reference to lower borrowing costs to the final borrower. At 380, the current bid rate is known as the best price bid at this time. At 390 collateral is to indicate the type of backing the facility has. At 391, At 391, the user is able to submit his own syndication for auction with various fields for input and a submit button. At 392, the user will be able to make changes to his already submitted loan syndication auction particulars. In this example, the user do not have any as shown in 392. It should be noted that as this is a LIVE auction, the opportunity to change any fields is very limited unless there are substantial change to conditions which make the loan itself unworkable for example the final borrower is in liquidation. Another instance which is permissible is to extend the date of closing the auction. Under the terms and conditions of this invention, the originator may update using the update button including aborting using the abort button which must be first approved by the Host Authority. There are severe penalties for aborting an auction.

In FIG. 5, this is the page for the user to bid on the loan syndication auction. The user arrives at this page after pressing the hyperlink from "OCBC" under the Syndicate column 300 in FIG. 4. This form is preferably implemented using ASP or PHP script in a known manner. At button 400, the user can press to see a list of other documents associated with this auction such as audited financial reports of the final borrower with the identity removed. At box 410, the user can appreciate the other bidders in this syndication. In Box 420, the user can submit a bid equal or better under the Guaranteed row. In the Conditional row, the user is allowed to input amounts and rate which he believes to be suitable but may not be competitive. This is usually refers to the lower boundary of the auction. In the autobid row, the user may place an upper boundary to his bid, that is a bid he is willing to go at the maximum if he is outbid by others. For example, BANK XYZ may place autobid up to Libor+90 and if another user should put in a bid at Libor+100, then LMS 34 will automatically place a bid by BANK XYZ at Libor+90 and notifies Bank XYZ. LMS 34 will then delete BANK XYZ's last bid to prevent double counting. At the same time, LMS 34 will also notify all the other bidders of the new updates. Both conditional and autobid parameters are only known to LMS 34 and by user only. Even Host Authority has no access to this information. As one can see from FIG. 5, user has a choice of either bidding as ANON or using "Your Name" which is the true name of the user.

It is noted that in a loan syndication auction and until the auction is finally close, the parcel committed as shown here at 20+20 million may be outbid by another bidder desiring to input 40 million at one time. In such a case and unless BANK XYZ outbids, it will only be allocated 10 million instead of the 20 million committed (ie 50−40=10). At the same time it is also recognised that there may not be one winner as being in a syndicated loan means other participants form part of the syndicate which differentiate this method from a ordinary auction system. In short LMS 34 must be able to finalise all the final submitted bids by tallying them to make up the total amount in the order of best price for the final borrower and submits this record in a matrix format to the loan originator which then must agree to this arrangement. Another issue is that unlike ordinary auction where one item is being auctioned off, a loan is divisible into parcels or offer rates and hence may include more than one winner at the end. As such the method of organising a loan syndication is significantly different. At button 430 the user can press to see other syndication currently being run by OCBC. At input Box 440, the user will be able to sent comments to OCBC anonymously. At button 450, the user may see what other comments that have been made by others so far on this loan auction by pressing on this. At button 460, this is the button to press to submit comments anonymously. At Box 470, the user is provided with a history of OCBC's activities which are extracted and compiled by LMS 34. At button 480, the user is agreeable to the syndication and submits. On pressing this button, it will ask for the digital certificate issued to the user which must be sent together for verification by Host authority. Once this is verified both user and syndicator will receive confirmation by Host Authority 36 and the result is updated into the database and will be seen by others as this is still running. At 490, the entire agreement pertaining to the Bond facility is shown readable on-line or may be downloaded.

FIG. 6 is a simplified personalised user interface illustrating a Direct Match home page for Lenders of the web site for the present invention. A user, which may be a lender or a syndicator after being authenticated by the web server and having chosen Direct Match, navigates to this page in the usual manner by activating the lenders hyperlink under Direct Match category. The page preferably includes a set of links at 500 where the user can click to see more details of the lender's requirements and to submit at FIG. 7. It is important to note here that users may use their real identity (OCBC) or Anonymously (Anon). At 510, one can see the type of facility being offered by the various lenders and upon clicking the link here, some description of the facility will be available. At 520, this column refers to the period of the facility. At 530, this column refers to the risk class of the final borrower where there they are rateable. AA in this instance will be well regarded as compared to C+. At 540, this column refers to the amount being offered by the lender. At 550, this column shows the country of normal legal domicile and hence risk the lender is interested to lend to. At 560, this column shows the industry that the lender (OCBC) is looking to apply the loan to. At 570, this column reflects the published rate LIBOR+120 at which the lender is willing to accept to lend the amount of 5 million. In column 580 the kind of backing the lender requires to secure this loan. In Box 590, the user has the ability to post their lending requirement which is then review by the host authority before being posted to the web site. In Box 591, this box shows that the lender has no other lending offerings at this time. This is further reflected in Box 592.

Activating the first hyperlink "OCBC" in column 500 in FIG. 6 navigates the user to a submission form as illustrated in FIG. 7.

Similarly, this form is preferably implemented using ASP or PHP script in a known manner. At button 600, the user (syndicator) can press to see a list of other syndication currently being run by OCBC which in this case is the lender. At input box 610, the user will be able to sent comments to OCBC anonymously. At button 620, this is the button to press to submit comments anonymously. At Box 630, the user is provided with a history of OCBC's activities which are extracted and compiled by LMS 34. At button 640, the user is agreeable to the lender's requirements and submits. At the bottom of this button, it should read "By submitting, you submit that the agreements and documents submitted with this submission conforms to the requirements of the lender. If you are submitting anonymously, your ID will be known upon acceptance by lender." On pressing this button, it will ask for the digital certificate issued to the user which must be sent together for verification by Host Authority 36. Once this is verified both user and lender will receive confirmation by Host Authority 36. Upon acceptance by Lender, then the deal is done and updates will follow by LMS 34. At 650, an agreement pertaining to this submission is readable on-line.

This agreement is submitted by the loan syndicator and not the lender using an upload facility button at 660. This is in contrast to FIGS. 3 & 5 where the agreement is already uploaded and available to all for review by the syndicator. At 670, variables capable of being inputted/change here is the number under "Parcel" where the user may input another amount but by default, it stands as the amount as submitted by the lender. It is noted here that on submitting to the lender, it is by no means acceptance by lender. The submitter's ID will not be revealed until the lender agrees to the agreement and terms of submission by submitter.

In FIG. 8, this is a page link from the hyperlink at FIG. 1B when the user press on Lenders under Auction category. Column 700 refers to the lenders' name. 710 refers to the type of facility sought. 720 refers to the term of the facility. 730 refers to the risk type of the final borrower. 740 refers to the amount available to lend. 750 refers to the country of the legal domicile of the final borrower which determines the country risk. 760 refers to the type of industry that the final borrower is in. 770 refers to best bid rate at this time. In this case, Libor+100 for OCBC. As this is a LIVE bidding process and until it is closed, one should note that a new bidder can come in and bid the full 5 million at a better price (ie higher rate) which will then deny those that already committed in this case BANK XYZ and ANON with 2 million each standing now as seen in FIG. 9. A better price here is reference to higher rates to the lender OCBC. At 780, collateral is to indicate the type of security backing the final borrower has to participate in this auction. At 790, the user is able to submit his own loan auction with various fields for input and a submit button. At 791, the user will be able to make changes to his already submitted loan auction particulars. In this FIG, the user do not have any as shown in 791. It should be noted that as this is a LIVE auction, the opportunity to change any fields is very limited unless there are substantial change to conditions which make the lending activity itself unworkable for example the lender is in liquidation. Another instance which is permissible is to extend the date of closing the auction. Under the terms and conditions of this invention, the lender may update using the update button including aborting using the abort button which must be first approved by the Host Authority 36. There are severe penalties for wrongfully aborting an auction.

In FIG. 9, this is the page for the user to bid on the lender's auction. The user arrives at this page after pressing the hyperlink from "OCBC" under the lender's column 700 in FIG. 8. This form is preferably implemented using ASP or PHP script in a known manner. At button 800, the user can click this upload button to include the offer documents and agreements pertaining to his syndication for submission to the Lender. At box 810, the user can appreciate the other bidders in this auction in order to get OCBC to participate in their syndicate. In Box 820, the user can submit a bid equal or better under the Guaranteed row. In the Conditional row, the user is allowed to input amounts and rate which he believes to be suitable but may not be competitive. This is usually refers to the lower boundary of the auction. In the autobid row, the user may place an upper boundary to his bid, that is a bid he is willing to go at the maximum if he is outbid by others. For example, BANK XYZ may place autobid up to Libor+150 and if user should put in a bid at Libor+120, then LMS 34 will automatically place a bid for Bank XYZ at Libor+130 and notifies Bank XYZ. At the same time, LMS 34 will also notify all the other bidders of the new conditions and deletes the previous BANK XYZ's bid to prevent double counting. Both conditional and autobid parameters are only known to LMS 34 and user. As one can see from FIG. 9 (Box 820), user has a choice of either bidding as ANON or using "Your Name" which is the true name of the user. At button 830 the user can press to see other lending offerings by OCBC. At input Box 840, the user will be able to sent comments to OCBC anonymously. At button 850, the user may see what other comments that have been made by others so far on this lender's auction by pressing on this. At button 860, this is the button to press to submit comments anonymously. At Box 870, the user is provided with a history of OCBC's activities which are extracted and compiled by LMS 34. At button 880, the user is agreeable to invite OCBC to be part of its syndication efforts by submitting a bid. At the bottom of this button, it should read "By submitting, you submit that the agreements and documents submitted with this submission conforms to the requirements of the lender. If you are submitting anonymously, your ID will be known upon acceptance by lender." On pressing this button, Host Authority 36 will ask for the digital certificate issued to the user which must be sent together for verification by Host authority. Once this is verified both user and syndicator will receive confirmation by Host Authority and the result is updated into the database and will be seen by others. At 890, the entire offer agreement pertaining to this submission is shown readable on-line. Again, the Lender reserves the final right to decide who the winners are at the end of the auction. Lender will receive a complete list similar to a risk return matrix showing all the participants with the best offers and terms as determined by LMS 34. If the submission is an anonymous one, the identity of the syndicator will not be known at this time.

Upon lender's decision on the winners, lender will sent an electronic reply back to the Host Authority 36 to confirm the list of winners and thereafter Host Authority 36 will send emails out to all the participants (successful and unsuccessful) of this auction. Host Authority will then send a detailed list included the real identities of all participant to the lender including previously anonymous ones if they have been selected as winners. If the lender is anonymous, only the winning bidders would know this identity from Host Authority 36 which is sent by email above.

FIG. 10 shows the user interface page under "My syndication" hyperlink from FIG. 1B. As mentioned previously loan syndication becomes more of an administrative process after the actual loan syndication has been formed by the above method. Hence in many ways, to co-ordinate this effort, this invention has also included programs to run such administration automatically. In FIG. 10, we show the user in this case a "Manager" running one loan syndication called OCBC BANK 3 YEARS BOND US 50 Million. It should be recognised that in running a loan syndication, several individuals will be involved and hence given different level of access. In our invention, the Manager has the highest level of access, follow by his immediate officers and loan participants. Access is provided by the Host Authority 36 and must be approved by the Syndicator involved by either on-line submission or by letter of authority. On-line submission is not shown in FIG. 10. At 900, this is a summary of the loan. At box 910, we are shown the list of participants to the loan syndication with amount of contribution and date of confirmation. This date of confirmation is a reference of signature date which is often an external affair. This date is not the on-line submission date. The results are usually keyed in manually. At 920 this shows the various important payment dates pertaining to this facility. These dates are inputted by another assigned officers and may be updated by the manager or accept by the manager. However any changes to these dates will automatically trigger an email to be sent to all the participants. The manager may wish to click on one of these dates and it will show the payment and interest associated with that date. At 930, this box shows the kind of documents held within the syndication in LMS 34. The status column indicates the status of these documents and where it is "NO" then in action will be an email where the Manager can click on to sent an email to the people responsible. In this case the people involved will be the officers in charged of administering the Loan Syndication. At 940 this is the monitoring box where all correspondence from the systems have been captured and viewable by the manager by clicking on the appropriate link such as say "Bank AXY seek clarification". These messages are generally arranged in a heading and related responses on them will be available on clicking further. Furthermore Box 930 and Box 940 are shown because the manager in this instance have clicked on Docs Storage and Monitoring links respectively at Box 950. If the manager wishes by clicking "messaging" in Box 950 will open another box relating to messaging. Messaging here refers to emails reminders to participants sent since the loan syndicate was established. In this case it is activated and hence maybe viewed. In Box 950 which is like a controller box, billings is also activated which means any billings sent and received during this time will be viewable. Settlement is not active at this time since no money has been received or sent. Settlement is use to track funds when they are sent including the ability to notify other banks that a certain amount of funds will be in their accounts and to net them out in the central bank accounts. As for accounts which is also not active, this is related to the profit and loss accounts used in the loan syndication and by clicking on this if it is activated, the manager will be able to see the in flow and out flow of funds that are associated with these accounts. At box 960, the manager may view his other syndication and participation. In these case there are none. But given there are, he may press the related link and will be brought into a similar page as FIG. 10 for "other syndication". As for being a participant, the page will be less informative and with less access as FIG. 10. A notable point is that as a participant, one can still see Box 910, Box 930 (without action function), Box 940 but only ones own correspondence and Box 920 but without any ability to make changes. Box 900 is also available. It should be noted without prejudice that this is only a representative of an admin page for a manager and by not means static and one of ordinary skill in the art would also recognise that other modification to achieve the same results are possible here. Modification including incorporate other tools should be to reflect the changing needs of the manager of the loan syndication to manage his syndication effectively. All this is possible as the method is build upon several programs situated in LMS 34 and not external to this invention.

Any reference above to lenders must necessarily mean they are potential lenders since their participation at the syndication stage is not finalized yet. When a loan facility is created by syndication also known as a syndicated loan, potential lenders become actual lenders by their commitments in portion to said facility. Therefore, the word 'lenders' used throughout this application means an entity which ordinary business is to lend money such as a bank and one skilled in the art will be able to understand that loan syndication denotes a loan in the process of syndicating with potential lenders. In short, they are potential lenders because they have yet to commit to a particular loan syndication facility.

In summary, in the present invention, users can post anonymous buyer bids for review and acceptance by syndicates, or syndicates can post anonymous seller bids for review and acceptance by customers. This invention also provides for different type of facilities and currencies. The present invention provides numerous advantages over the prior art.

Lenders that desire to participate in a loan syndication may obtain loan rate information and terms available from a plurality of different loan syndicators. There is no need for them to expose its identity to obtain a given rate quote. This by itself is a complete advantage to the prior art where they are mass faxed by the originator to determine their interests. Further, a potential lender may bid on a given loan facility of interest in an anonymous manner, and this bid may be accepted by a loan syndicator that has excess unsold loan facility. In a like manner, loan originators may post bids for particular return/risk profiles that may then be accepted, in whole or in part, by a lender. Once accepted, the server confirms the agreement by e-mail and issues appropriate confirmation agreements electronically. Another advantage in the auction process is the ability to have automated bidding and to submit conditional bids which improves on the dynamism of competitive pricing.

Once a loan syndication is completed, this invention provides administrative handling functions to manage the loan syndication. Of importance is the ability to monitor the various commitments by participants after the loan syndication is completed. The invention also stands out in consolidating all the loan requirements into an electronic like calendar with tasks assigned in order to monitor various administrative functions such as notifications, payments, billings, documentation and providing real time status.

Preferably, the server charges a given fee per bid accepted, although any convenient fee structure may be implemented. As noted above, the inventive mechanism is preferably implemented within at least one server. Thus, the invention does not require any modifications to conventional client machine hardware or software. Although not meant to be limiting, the above-described functionality is preferably implemented as standalone native code or, alternatively, as a Java servlet. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Further, as used herein, a Web "client" should be broadly construed to mean any computer or component thereof directly or indirectly connected or connectable in any known or later-developed manner to a computer network, such as the Internet or wireless Internet. The term Web "server" should also be broadly construed to mean a computer, computer platform, an adjunct to a computer or platform, or any component thereof capable of being a server in the ordinary meaning of the technical reference.

I, the inventor claims:

1. A method operative at a server for negotiating and managing loan syndication over a network, comprising the steps of:
   receiving a request to post a requirement to syndicate a loan opportunity by a first entity over a network;
   displaying information about said requirement accessible by any entities over said network;
   in response to said requirement, said first entity receiving an online comment from one or more second entities about conditions and terms of said loan opportunity over said network;
   in response to said comment, enabling said first entity to negotiate said conditions and terms with said second entity or other different second entities over said network about committing at least a portion of said loan opportunity in aggregate with different entities forming a loan syndicate;
   providing ratings associated with the entities based on past syndication data; and
   whereby said loan opportunity is pending agreement.

2. The method as described in claim 1 includes the step to anonymize identities of the entities.

3. The method as described in claim 1 includes providing a feedback routine for commenting about the entities and said feedback is submitted by the entities over said network.

4. The method in claim 1 further including the steps: whereby said requirement is a lending and first entity is a potential lender.

5. The method in claim 1 further includes an auction routine for entities to place loan commitment bids and whereby more than one entity can be selected forming the loan syndicate.

6. The method as described in claim 1 includes a step:
   updating online electronic documents incorporating said negotiated conditions and terms before creating the loan syndicate by agreement.

7. The method in claim 1 further includes the steps comprising:
   determining best offers in terms of a risk-return matrix satisfying at least both minimum cost and total loan amount sought for said requirement; and
   determining by said first entity whether to accept or reject for each of said offers.

8. An apparatus for syndicating a loan, comprising:
   a programmed computer, further comprising:
   a memory having at least one region for storing executable program code; and a processor to execute the program code stored in the memory, wherein the program code, further comprising:
   code to receive a request to post a requirement to syndicate a loan opportunity by a first entity over a network;
   code to display information about said requirement accessible by any entities over said network;
   code to enable said first entity to receive an online comment about conditions and terms of loan opportunity in response to said requirement from one or more second entities over said network;
   code to respond to said comment by enabling said first entity to negotiate said conditions and terms with said second entity or other different second entities over said network about committing at least a portion of said loan opportunity in aggregate with other different entities forming a loan syndicate;
   code to provide ratings associated with the entities based on past syndication data; and
   whereby said loan opportunity is pending agreement.

9. The apparatus according to claim 8, wherein program code further include codes for an auction routine and whereby more than one entity can be selected forming the loan syndicate.

10. The apparatus according to claim 8, wherein program code further include codes implementing a feedback routine for commenting about said entities and said feedback is submitted by said entities over said network.

11. The apparatus according to claim 8, wherein program code further include codes to anonymize identities of said entities.

12. The apparatus according to claim 8, wherein program code further include codes implementing steps:
   whereby said requirement is a lending and first entity is a potential lender.

13. The apparatus according to claim 8, wherein program code further include codes implementing steps to update online electronic documents incorporating said negotiated conditions and terms before creating said loan syndicate by agreement.

14. The apparatus according to claim 8, wherein program code further includes codes configured to perform steps comprising:
   determining best offers in terms of a risk-return matrix satisfying at least both minimum cost and total loan amount sought for said requirement; and
   receiving an acceptance or rejection for each of said offers.

15. Computer executable software code stored on a computer readable medium, the code when executed on a computer performs negotiating and managing a loan syndication method comprising:
   receiving a request to post a requirement to syndicate a loan opportunity by a first entity over a network;
   displaying information about said requirement accessible by any entities over said network;
   in response to said requirement, said first entity receiving an online comment from one or more second entities about conditions and terms of said loan opportunity over said network;
   in response to said comment, enabling said first entity to negotiate said conditions and terms with said second entity or other different second entities over said network about committing at least a portion of said loan opportunity in aggregate with other different entities forming a loan syndicate;
   providing ratings associated with said entities based on past syndication data; and whereby said loan opportunity is a pending agreement.

16. The computer executable software code stored on a computer readable medium according to claim 15 wherein said medium further stored code configured to perform steps comprising:
   determining best offers in terms of a risk-return matrix satisfying at least both minimum cost and total loan amount sought for said requirement; and
   receiving an acceptance or rejection for each of said offers.

* * * * *